UNITED STATES PATENT OFFICE.

CARL THEODOR THORSSELL AND HARALD LUDVIG REINHOLD LUNDÉN, OF GOTTENBORG, SWEDEN.

PROCESS FOR THE PRODUCTION OF NITRATES FROM AMMONIA, AMMONIUM COMBINATIONS, OR ORGANIC NITROGEN COMBINATIONS.

1,286,838.  Specification of Letters Patent.  Patented Dec. 3, 1918.

No Drawing.  Application filed April 10, 1918. Serial No. 227,794.

*To all whom it may concern:*

Be it known that we, CARL THEODOR THORSSELL, a citizen of Sweden, residing at Södra Hamngatan 11, Gottenborg, Sweden, and HARALD LUDVIG REINHOLD LUNDÉN, a citizen of Sweden, residing at Södra Hamngatan 11, Gottenborg, Sweden, have invented certain new and useful Improvements in Processes for the Production of Nitrates from Ammonia, Ammonium Combinations, or Organic Nitrogen Combinations, of which the following is a specification.

In processes hitherto known for the oxidation of ammonia, ammonium combinations or organic nitrogen combinations, by means of bacteria in the presence of physiologically basic materials, a substratum carrying the nitrificating bacteria and consisting for instance of peat has been used. This substratum has some of the attributes necessary for the unimpeded reaction but not all of them as it easily separates into slime in such a way that the access of air necessary for the reaction is checked.

In order to be independent of the material used the oxidation may be carried out according to the invention.

A layer of alkali, calcium carbonate or other material forming alkali when reacting with water, is placed in a receptacle on a grating or a perforated bottom, in larger pieces at the bottom and in a finely divided form at the top. A solution of nitrate (for instance nitrate of calcium) already oxidized by means of bacteria and thus containing bacteria from a preceding operation is applied over said layer. A comparatively diluted solution of the nitrogen combination to be oxidized is then introduced in this nitrate whereafter compressed air in very finely divided form is pressed in through the grating in such a way that it spreads all over the receptacle and brings about an extremely intimate contact between the salt solution, the air, the bacteria, and the finely divided calcium carbonate. Part of the bottom layer containing calcium carbonate is stirred up by the compressed air. Thus it will be intermingled with the liquid and the oxygen of the air, the ammonium combination and the calcium carbonate are intimately mixed. The bacteria during this blowing in of air having done their work and the present nitrogen combination having been transformed into nitrate, a part of the solution is taken out of the receptacle or drawn off and prepared to finished article, whereafter a quantity of fresh liquid containing the nitrogen combination to be oxidized corresponding to this part is added to the rest of the finished solution of nitrate in the receptacle. Then the blowing in of air, the drawing off and the adding of fresh liquid are repeated. In this way the bacteria in the receptacle are always kept up and the process may be repeated an unlimited number of times, if it is seen to that the calcium carbonate is present and that only a part of the finished solution of nitrate is drawn off at a time.

The receptacle may be provided with suitable drawing off and charging devices and in some cases also with a mechanically driven stirring device.

A filter bed may also be placed over the layer of alkali resting on the grating for the purpose of keeping the bacteria back when the liquid is drawn off. A layer of coke, gravel, sand, charcoal-powder, or powdered clay brick with a thickness of a few centimeters may be used as a filter. The bottom can also consist of common filter disks.

Having thus described our invention, what we claim as new and desire to secure by Letters Patent is:

1. The herein described process, which consists in applying a solution of calcium nitrate to a porous mass of calcium carbonate, said solution being inoculated with a nitrificating bacteria; applying to the porous mass thus treated a dilute solution of a nitrogen compound to be oxidized; and passing compressed air through the porous mass of calcium carbonate.

2. The herein described process, which consists in inoculating a solution containing calcium nitrate with a nitrificating bacteria, passing the liquid thus obtained through a porous mass of calcium carbonate, and passing through the mass of porous calcium carbonate in the presence of the solution containing calcium nitrate a solution of a nitrogen compound to be oxidized, while passing compressed air through the porous mass of calcium carbonate.

3. The herein described process, which consists in oxidizing a solution containing calcium nitrate by inoculating the same with a nitrificating bacteria, passing the solution thus treated through a mass formed of more or less finely divided calcium carbonate, subsequently passing through the mass thus treated a solution containing a nitrogen compound to be oxidized, and simultaneously passing compressed air through said mass while the nitrogen compound is being passed therethrough.

In testimony whereof, we have signed our names to this specification in the presence of two subscribing witnesses.

CARL THEODOR THORSSELL.
HARALD LUDVIG REINHOLD LUNDÉN.

Witnesses:
ROBERT HAMMOND,
SYLVESTER E. ROTHCHILDS.